United States Patent
Laminette et al.

(10) Patent No.: US 10,161,592 B2
(45) Date of Patent: Dec. 25, 2018

(54) LED HEADLAMP WITH REFRACTIVE INTERFACE CREATING CUT-OFF FOR VEHICLES

(71) Applicant: VALEO VISION, Bobigny Cedex (FR)

(72) Inventors: Maxime Laminette, Angers (FR);
Jean-Francois Doha, Angers (FR);
Lionel Floch, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/598,847

(22) Filed: May 18, 2017

(65) Prior Publication Data
US 2017/0336042 A1    Nov. 23, 2017

(30) Foreign Application Priority Data

May 18, 2016    (FR) ...................................... 16 54403

(51) Int. Cl.
*F21S 8/10* (2006.01)
*B60Q 1/14* (2006.01)
(Continued)

(52) U.S. Cl.
CPC ............ *F21S 48/1241* (2013.01); *B60Q 1/14* (2013.01); *F21S 41/141* (2018.01); *F21S 41/147* (2018.01);
(Continued)

(58) Field of Classification Search
None
See application file for complete search history.

(56) References Cited

U.S. PATENT DOCUMENTS

2004/0156209 A1    8/2004  Ishida
2008/0112173 A1*   5/2008  Dassanayake ........... B60Q 1/12
                                                          362/466
(Continued)

FOREIGN PATENT DOCUMENTS

DE   10 2013 013 995 A1   7/2014
EP        2 818 792 A2    12/2014
EP        2 993 392 A1    3/2016

OTHER PUBLICATIONS

French Preliminary Search Report dated Aug. 30, 2016 in French Application 16 54403 filed on May 18, 2016 (with English Translation of Categories of Cited Documents).

*Primary Examiner* — Ashok Patel
(74) *Attorney, Agent, or Firm* — Oblon, McClelland, Maier & Neustadt, L.L.P.

(57) ABSTRACT

The present invention relates to a lighting module for an automobile headlamp that is able to emit a cut-off light beam along a predetermined optical axis. The lighting module includes a light source for generating a beam and an optical element for receiving the beam generated by the light source and configured to form from this beam the cut-off light beam. The optical element has a collimator configured to receive the beam generated by the light source and to collimate this beam into a collimated beam. An optical coupler is configured to couple the collimated beam into a coupled beam in a lightguide. A cut-off means is disposed within the lightguide on the path of the rays of the coupled beam and configured to intercept a portion of the rays in the lightguide and to form a cut-off beam. At least one output face of the lightguide is configured to project the cut-off beam outside of the optical element, and the optical element is formed as a single part.

25 Claims, 6 Drawing Sheets

Figure 1:
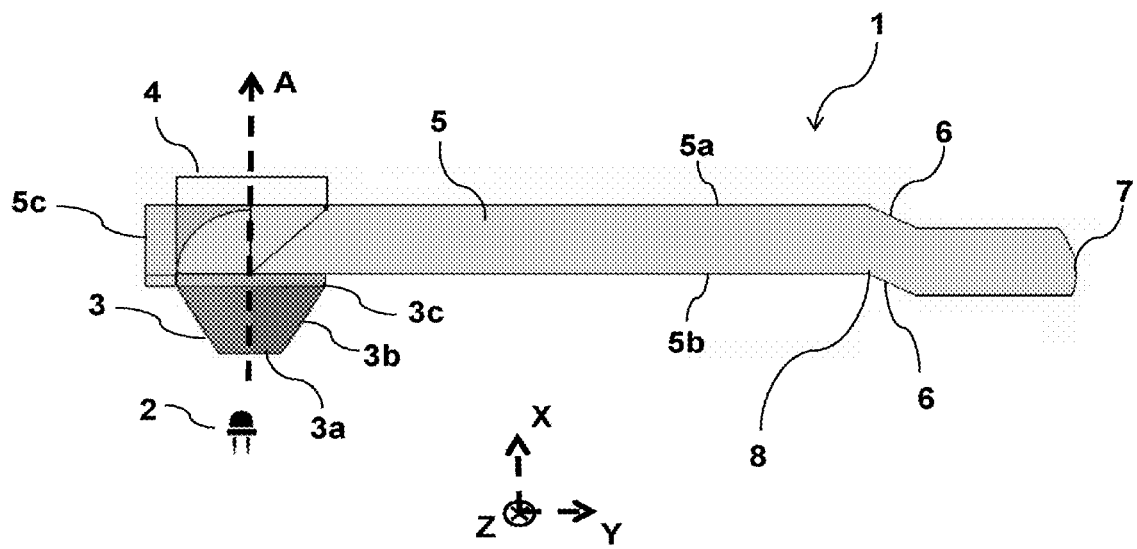

(51) Int. Cl.
  *F21S 41/141*  (2018.01)
  *F21S 41/147*  (2018.01)
  *F21S 41/20*  (2018.01)
  *F21S 41/24*  (2018.01)
  *F21S 41/27*  (2018.01)
  *F21S 41/36*  (2018.01)
  *F21Y 115/10*  (2016.01)

(52) U.S. Cl.
  CPC ............... *F21S 41/24* (2018.01); *F21S 41/27* (2018.01); *F21S 41/285* (2018.01); *F21S 41/36* (2018.01); *B60Q 2300/056* (2013.01); *B60Q 2300/42* (2013.01); *F21Y 2115/10* (2016.08)

(56) References Cited

U.S. PATENT DOCUMENTS

| | | | |
|---|---|---|---|
| 2013/0155723 A1* | 6/2013 | Coleman | G02B 6/0018 362/621 |
| 2014/0285994 A1* | 9/2014 | Suzuki | F21S 41/16 362/84 |
| 2014/0362596 A1 | 12/2014 | Nakaya | |
| 2014/0362600 A1* | 12/2014 | Suckling | F21S 48/1225 362/583 |
| 2015/0323147 A1* | 11/2015 | Kanayama | F21V 11/16 362/487 |
| 2015/0369436 A1 | 12/2015 | Wintzer et al. | |
| 2015/0375672 A1* | 12/2015 | Takahashi | G02B 6/0068 701/49 |
| 2016/0053967 A1 | 2/2016 | Owada | |

\* cited by examiner

LED HEADLAMP WITH REFRACTIVE INTERFACE CREATING CUT-OFF FOR VEHICLES

The present invention relates to a headlamp for an automobile. The invention more particularly concerns an optical illumination module able to produce a cut-off light beam, and configured to ensure an LED cornering headlamp (cornering lamp) function and/or a fixed bending light function.

Among light-emitting-diode (LED) headlights, there are known headlamps that emit a high-intensity beam in the direction of a road scene. These headlamps are able to ensure, in particular, a function of fixed bending light (FBL) or dynamic bending light (DBL). The FBL and/or cornering function makes it possible to progressively illuminate the roadside when the vehicle is cornering. To this end, a light source is provided which is able to progressively generate a beam illuminating the road while a corner is being negotiated. However, in order to avoid the emitted light dazzling another driver, means for producing a cut-off of the beam at a certain level above the road are generally provided. The light rays of the illumination beam are thus emitted below a line or a plane, referred to as the "cut-off".

In this respect, there are known headlamps comprising an optical module emitting a cut-off light beam. A headlamp of this type is known for example from EP 1 715 245, which describes a lighting module providing a cut-off light beam and having a bender without a reflective coating, i.e. functioning by internal reflection.

A headlamp configured to emit a cut-off beam must however emit a sufficient light flux in the direction of displacement of the vehicle, or in a slightly oblique direction with respect to the longitudinal axis of the vehicle. This poses a certain number of problems since headlamps normally comprise one or more optical modules emitting light beams the optical axes of which are more or less coincident with the longitudinal axis of the vehicle.

This type of module also presents various other drawbacks. A frequent problem encountered in this context concerns the means for limiting the output height of the light beam emitted by such headlamps, while preserving a sufficient light flux and optimal performance. Moreover, modules of this type generally enable illumination of a road scene only over a small aperture angle. The juxtaposition of several of these modules in order to construct a wide-beam headlamp makes it possible to solve this problem, but poses problems in terms of size because of the increased thickness of the device. Specifically, the large volume occupied by such a headlamp is a disadvantage to juxtaposition of several of these modules in order to form a cut-off light beam. In particular it is known that these lighting modules require complex manufacturing processes using multilayer molds. Moreover, where it is desired to join several modules, the output face is not continuous and may reduce the quality of the beam. Finally, the large size of these modules considerably increases the unit price of such headlamps and makes their production cost prohibitive.

In order to overcome these difficulties, the invention aims to provide a multisource LED headlamp with a refractive interface, affording a cut-off beam, and in which several modules make it possible to generate said cut-off light beam. A particular aim of the invention lies in providing a lighting module for an automobile headlamp, able to emit a cut-off light beam along a predetermined optical axis, said lighting module comprising:

a light source for generating a beam,
an optical element for receiving the beam generated by the light source and configured to form from this beam said cut-off light beam,
said optical element comprising:
a collimator configured to receive the beam generated by the light source and to collimate this beam into a collimated beam,
an optical coupler configured to couple the collimated beam into a coupled beam in a lightguide,
a cut-off means disposed within said lightguide on the path of said rays in the lightguide and forming a cut-off beam, and
at least one output face of said lightguide configured to project said cut-off beam outside of the optical element,
and characterized in that the optical element is formed as a single part.

The term "substantially parallel directions", and more precisely "substantially parallel rays" of a light beam are understood here as meaning that the rays are directed in the form of a beam having rays which are parallel to plus or minus 5°. Moreover, in the remainder of the description, the term reflective face or surface will be understood as meaning both a face or surface able to reflect an incident light ray by total reflection and a face or surface coated with a reflective coating for reflecting an incident light ray.

According to different supplementary features of said lighting module which may be taken together or separately:
the lightguide has a substantially constant thickness;
the cut-off means comprises a ridge of a surface of said lightguide, especially a lower wall of the lightguide located between said coupler and said at least one output face;
the cut-off means comprises a surface of said lightguide, said wall extending from said ridge and arranged to return a portion of the rays in the lightguide;
the cut-off means forms a step in the lightguide, said step forming an angle with a horizontal portion and with an inclined portion;
the collimator is configured to deflect the rays of the beam generated by the source in such a way as to render them substantially parallel to each other;
the collimator is a solid of revolution having an axis of revolution and comprises one or more reflective surfaces;
the collimator comprises a lens, a reflector, a refractor, or a collimation means of the concave or convex type;
the collimator comprises one or more internal faces arranged to reflect and/or refract rays of the beam generated;
the optical coupler comprises a plurality of reflective faces, each of said reflective faces in particular having a section in the shape of a polynomial segment, especially parabolic;
the optical coupler is configured to split the collimated beam into several separate sub-light-beams, and especially into three separate sub-light-beams each emitted at 90° with respect to each other;
the optical coupler comprises a first reflective face arranged to reflect the rays of a first sub-light-beam of the split collimated beam in a direction substantially parallel to the optical axis toward the cut-off means; where appropriate, this first reflective face is a first coupling face arranged to reflect and focus the rays of the first sub-beam onto the cut-off means;
the optical coupler comprises at least a second reflective face arranged to reflect the rays of a second sub-light-beam of the split collimated beam toward one or more reflection surfaces of the lightguide, and possibly a third reflective face arranged to reflect the rays of a third sub-light-beam of the split collimated beam toward one or more other reflection surfaces of the lightguide;

the light source comprises a plurality of light-emitting diodes disposed on the same plane, said plane being disposed under said collimator and/or under said cut-off means with respect to said optical axis;

the lightguide comprises a plurality of faces, in particular planar, disposed in proximity to said optical coupler in order to redirect all of the rays of said sub-beam in the lightguide in a direction substantially parallel to the direction of said optical axis toward the cut-off means;

the lightguide has an upper face and a lower face joined together by an edge face, said upper face and said lower face extending in planes which are substantially parallel to one another;

the lightguide comprises at least one reflective face configured to receive a portion of the rays of the beam coupled by the optical coupler, especially of the second and third sub-beams, and for reflecting and focusing these rays onto the cut-off means;

the face or faces of the lightguide are disposed to the rear of the optical coupler along the optical axis;

the distance separating the distal ray of said cut-off beam and said optical axis is equal to or less than 10 mm.

The invention also aims to provide a headlamp comprising several lighting modules, said modules having one or more of the features above and being characterized in that several of said modules are juxtaposed, preferably five of said modules, in order to generate a beam, said resulting beam following the direction of an optical axis of one of said modules.

According to different supplementary features of said headlamp which may be taken together or separately:

the output faces of each of said modules are combined into a single smooth, continuous surface, especially an outer lens common to said several modules;

the modules are configured to produce a fixed bending light function and/or a cornering function with a light flux equal to or greater than 200 lumens.

Figure 2:
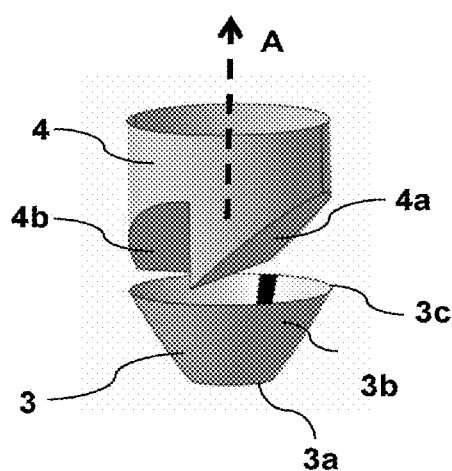
Figure 3:
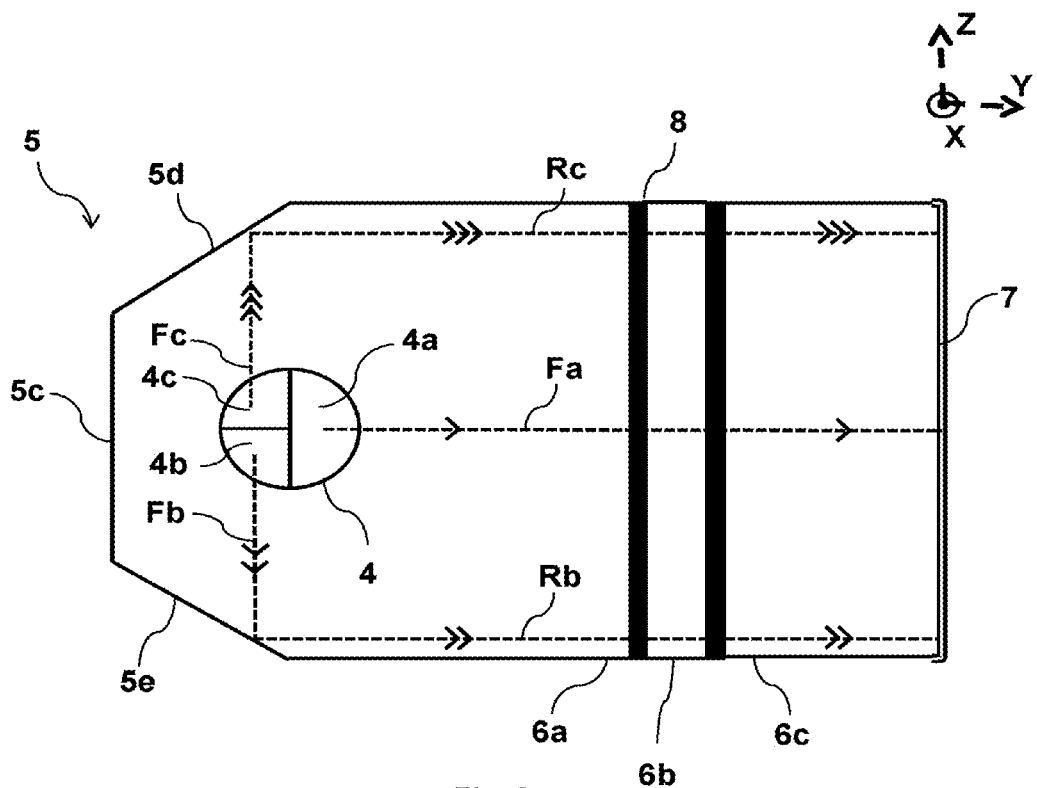
Figure 4:
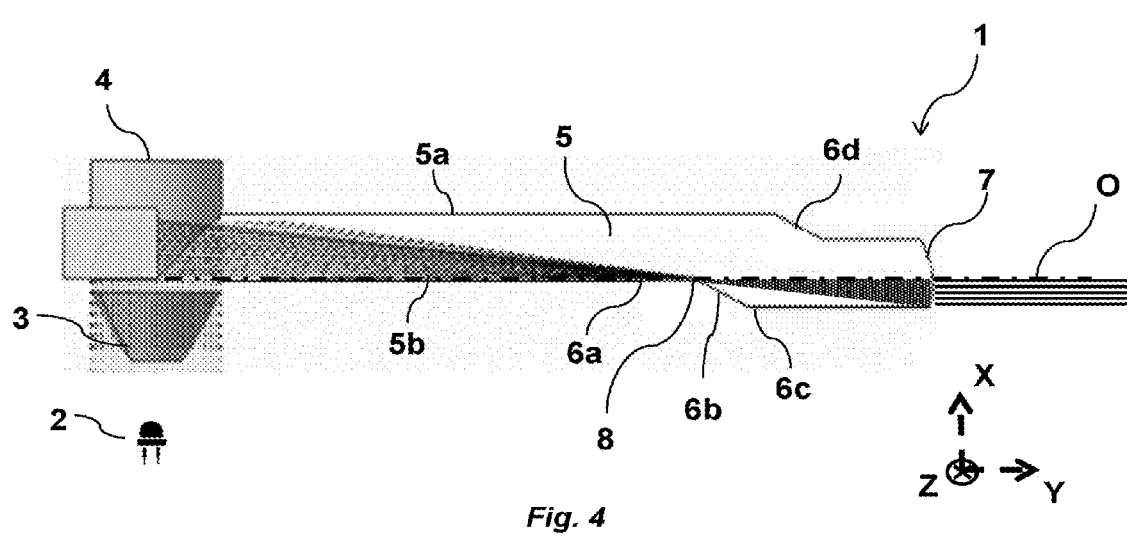
Figure 5A:
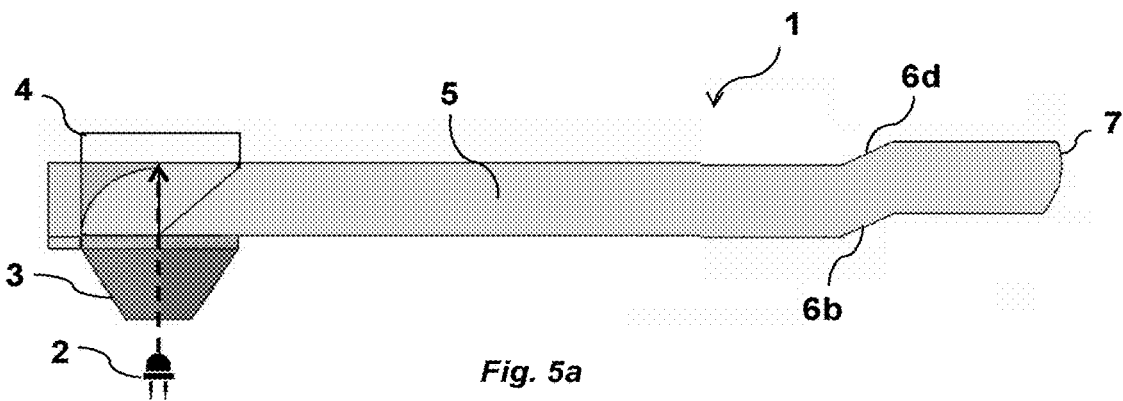
Figure 5B:
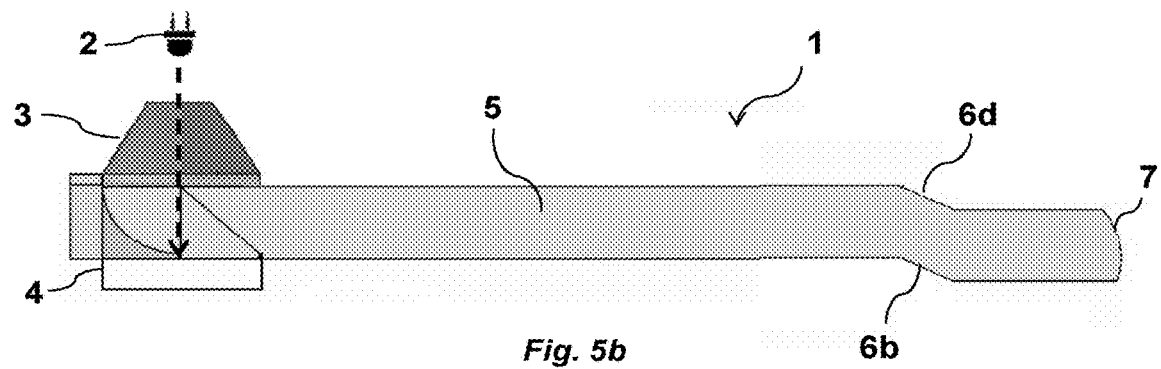
Figure 5C:
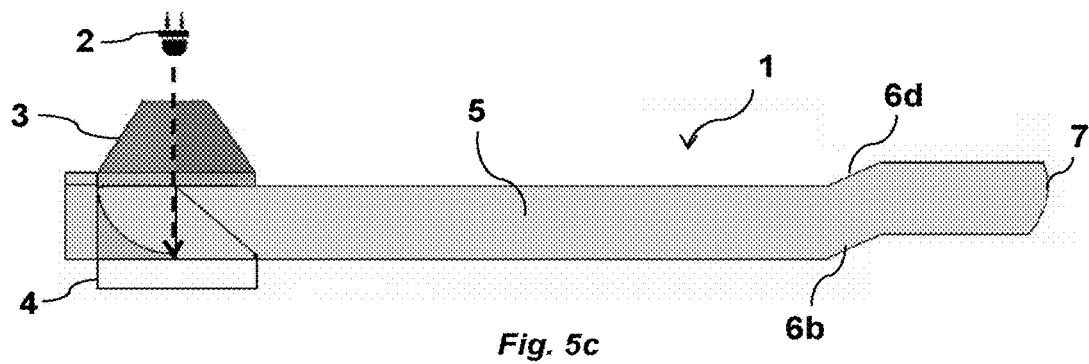
Figure 6:
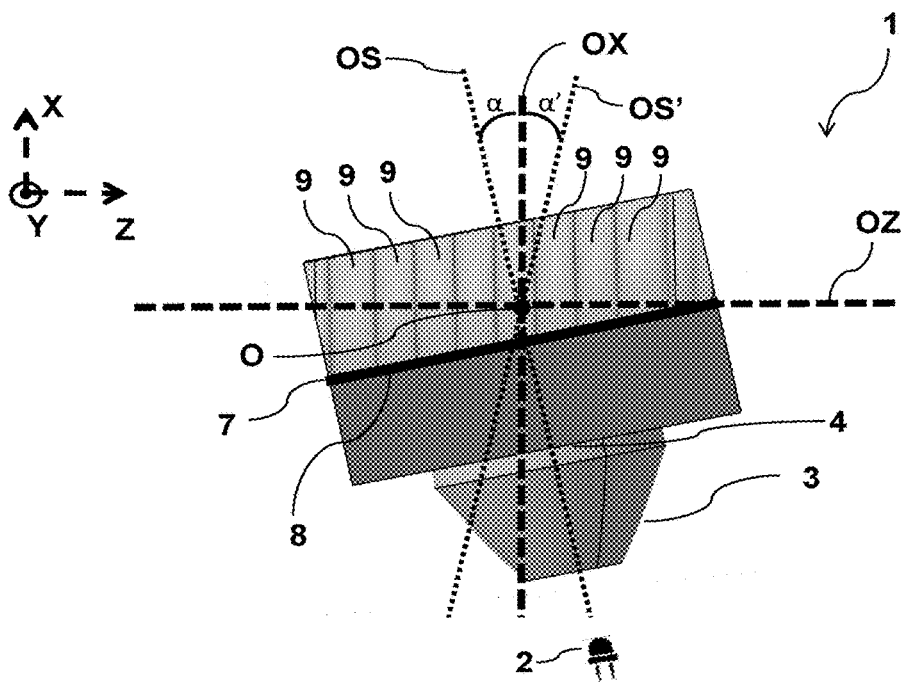
Figures 7, 8:
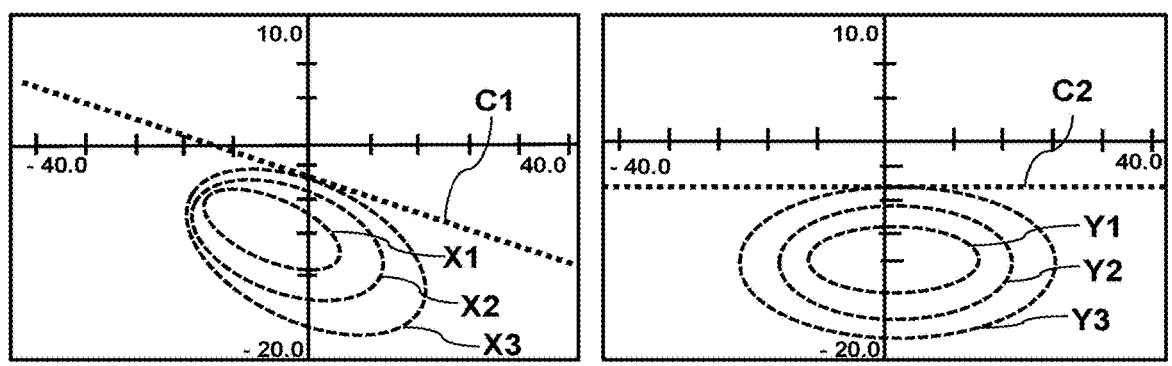
Figure 9A:
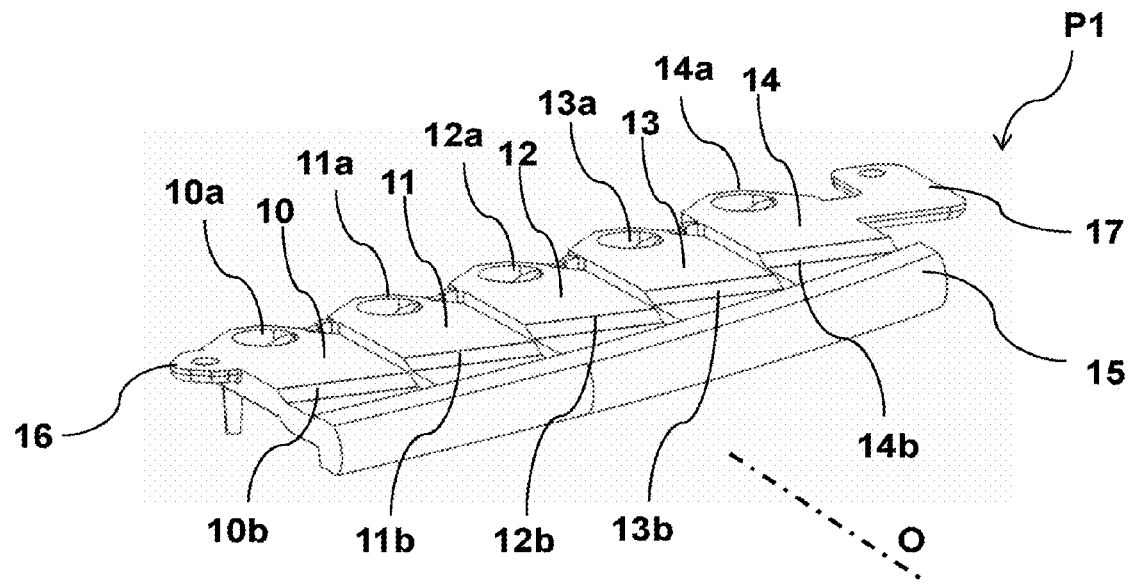
Figure 9B:
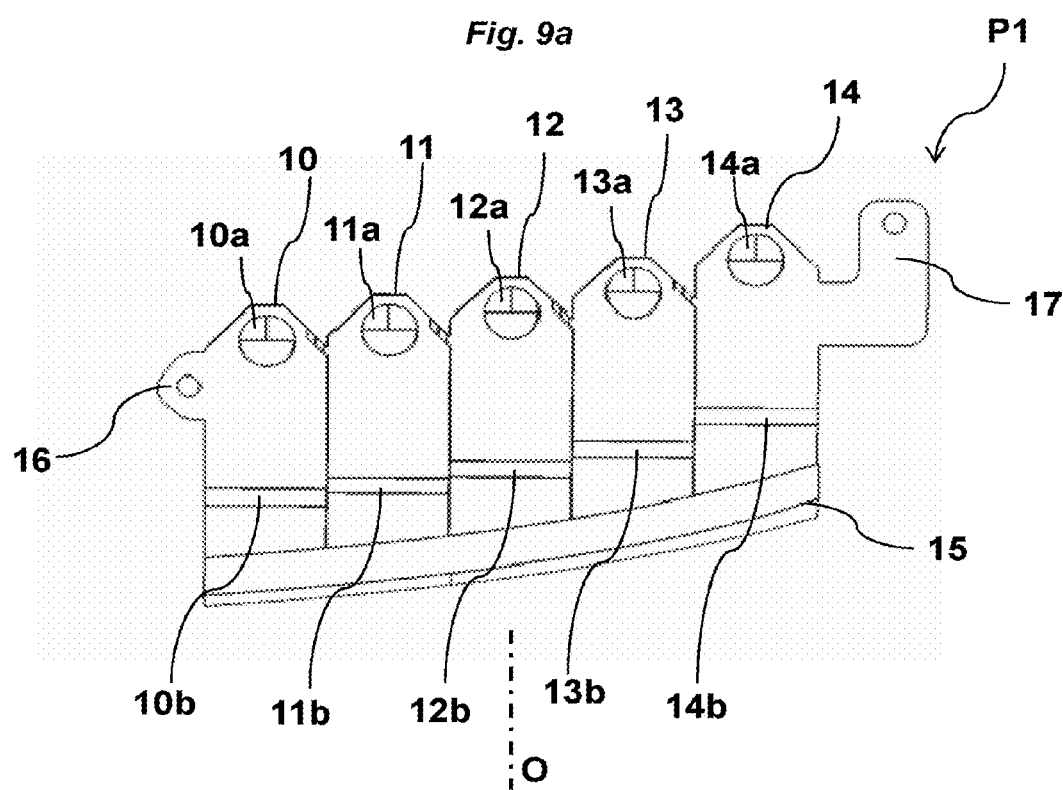
Figure 10A:
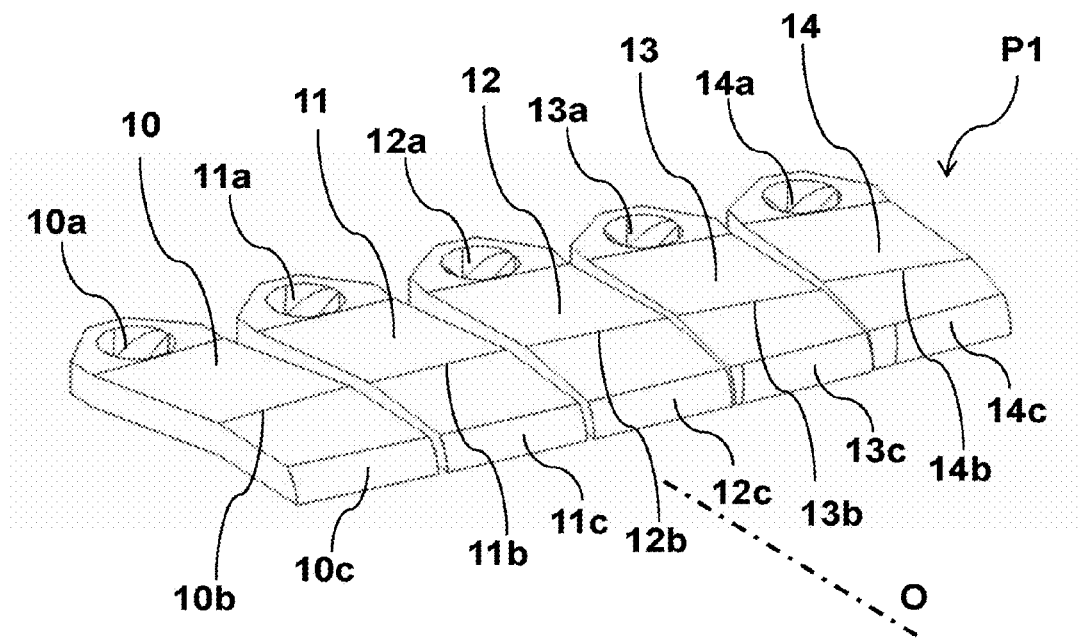
Figure 10B:
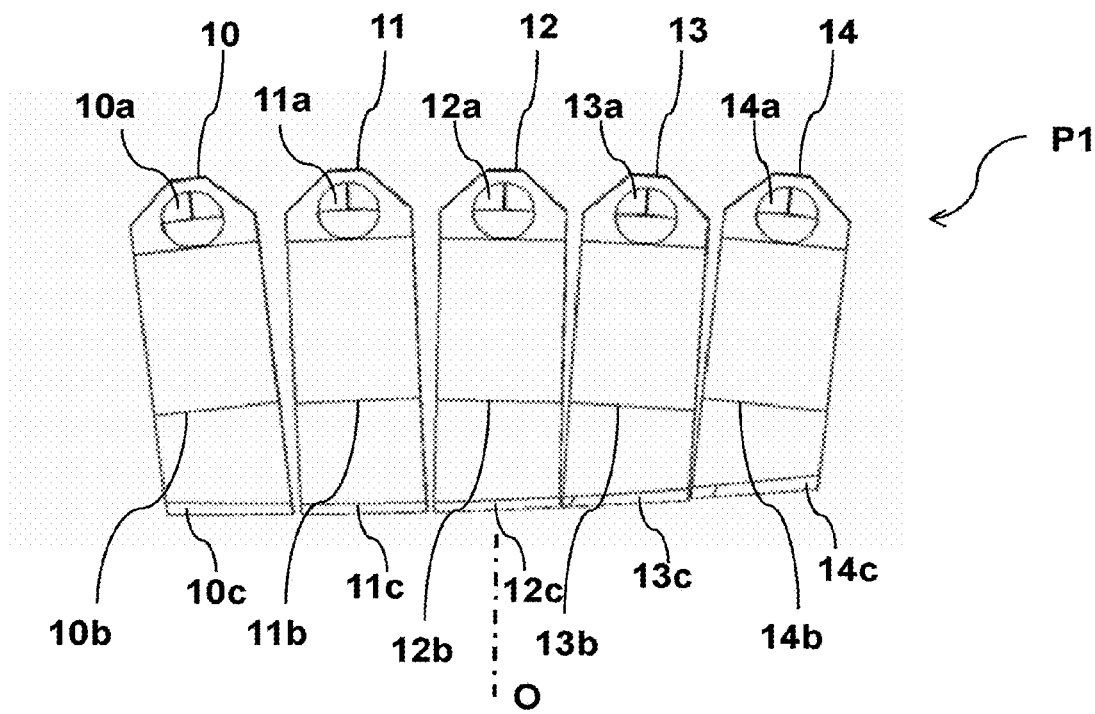

Other features, details and advantages of the invention will become apparent on reading the description which is provided with reference to the appended drawings given by way of example and illustrating, respectively:

FIG. 1, a view in transverse section of a lighting module according to an exemplary embodiment of the invention;

FIG. 2, a perspective view in cross section of a collimator and of a coupler according to an exemplary embodiment of the invention;

FIG. 3, a schematic diagram illustrating functioning of a coupler according to an exemplary embodiment of the invention;

FIG. 4, a schematic diagram illustrating the plot of the light rays transmitted in a lighting module according to an exemplary embodiment of the invention;

FIGS. 5a, 5b and 5c, respectively, a view in cross section of a lighting module according to several exemplary embodiments of the invention;

FIG. 6, a front view in cross section of a lighting module according to an exemplary embodiment of the invention;

FIG. 7, a network of isolux curves established for a given light flux and obtained with a lighting module the output surface of which does not comprise any thickness modulation for modifying the cut-off inclination of said beam;

FIG. 8, a network of isolux curves established for a given light flux and obtained with a lighting module the output surface of which comprises thickness modulation for modifying the cut-off inclination of said beam;

FIGS. 9a and 9b, a view in perspective and a view in cross section from above, respectively, of a headlamp according to a first exemplary implementation of the invention; and FIGS. 10a and 10b, a view in perspective and a view in cross section from above, respectively, of a headlamp according to a second exemplary implementation of the invention.

FIG. 1 depicts a view in transverse section of a lighting module 1 able to provide a cut-off light beam for an automobile headlamp. In the remainder of description, it will be understood that the surfaces of the module 1 define an orthogonal marker XYZ the directions X, Y and Z which correspond respectively to the height axis of said module along X, to the length axis of said module along Y, and to the width axis of said module along Z.

According to an exemplary embodiment of the invention, a light source 2 is disposed below the module 1. In the context of the present text, the terms "above" and "below" will be understood as indications of orientation when the module 1 is disposed in the normal position of use, once it has been incorporated into a headlamp mounted in a vehicle. According to the exemplary embodiment of the invention, we will also define the plane of the horizontal as being parallel to the plane of the road illuminated by said headlamp in its nominal operating mode. It will be understood that a module is not necessarily oriented parallel to the plane of the horizontal in the directions Y and Z as respectively defined by the length axis and by the width axis of said module. According to the exemplary embodiment of the invention, the source 2 is a wide source, the light rays of which have any direction in space. Preferably, the source 2 is a light-emitting diode, abbreviated to LED. Advantageously, the source 2 comprises several light-emitting diodes located in the same plane, and disposed for example on a printed circuit board PCB located below the module 1. The fact that said LEDs are disposed on a PCB on the same plane facilitates manufacture of a lighting module according to the exemplary embodiment of the invention, especially the operations to connect and weld the various components.

As illustrated in FIG. 1, the lighting module 1 comprises an optical element comprising a plurality of elements. According to an exemplary embodiment of the invention, said optical element is formed as a single part, and comprises means for redirecting light, in particular a collimator 3, a coupler 4 and a lightguide 5, both located above the light source 2. Advantageously, the collimator 3 and the coupler 4 may be in contact. According to the exemplary embodiment of the invention, the collimator 3 is located below the guide 5. The collimator 3 is a solid of revolution characterized by an axis of revolution A, said axis of revolution being directed in the direction X of the marker XYZ. Said collimator comprises one or more reflective surfaces. As a variant, said collimator may comprise a lens, a reflector, a refractor, or any other collimation means of the concave or convex type.

As illustrated in FIG. 1 and in FIG. 2, the collimator 3 comprises a lower input face 3a, one or more lateral reflection faces 3b, and an upper output face 3c. The lower face 3a of the collimator 3 is a light input face able to receive the light emitted by a light source when said source is disposed under said collimator. A collimator according to the exemplary embodiment of the invention is typically configured to receive all of the rays of the light beam emitted below the input face 3a, in particular all of the rays emitted by the source 2. Preferably, the source 2 is disposed on the axis A and below the collimator 3. The lateral face or faces 3c may have a cylindrical shape with a profile which is parabolic, or close to a parabola, when a section of the latter is considered in a plane orthogonal to the direction of the horizontal. In particular, the collimator 3 has the shape of a truncated cone the bases 3a and 3b of which are transparent to the passage of light, and therefore the lateral face or faces 3c reflect the light by total reflection. The faces 3a, 3b and 3c of the collimator 3 are calculated in such a way as to homogeneously collect the light intensity emitted by the source 2. Independently of their initial directions, the collected rays are reflected by one or more internal faces of said collimator, the latter being configured to render the collected rays substantially parallel to each other at the output of the latter.

The light rays emitted by the source 2 and passing through the collimator 3 are reflected by the lateral face or faces 3c in order to be directed directly toward the output face 3c located opposite the face 3a. These faces are configured to reflect the rays in a direction substantially parallel to the axis X when the latter emerge from the collimator 3 via the face 3c. These rays are transmitted in the direction of the input of the coupler 4 located above the collimator 3. The collimator 3 is itself located below the coupler 4 and below the lightguide 5.

The lightguide 5 of the module 1 has an upper face 5a and a lower face 5b joined together by an edge face 5c. The upper 5a and lower 5b faces extend in planes substantially parallel to one another. The lightguide 5 may have several deformations, however, in particular one or more steps. The guide 5 is configured to have a substantially constant thickness, i.e. constant to plus or minus 10%, at all points over the length thereof. The term "thickness" is understood as meaning the distance separating the upper face 5a and the lower face 5b of said guide on a plane perpendicular to said upper face. The internal surfaces of the guide may be partially or completely coated with a reflective material. According to a mode of embodiment of the invention, two steps 6 and one output face 7 are also present, as will be described hereinafter. These steps, and especially the step corresponding to the lower face 5b, may play the role of an optical bender. The edges of the bender and materials constituting the latter possibly enable said bender to work on the basis of total reflection. Said bender is able to vertically deflect the light rays coming from the coupler in such a way as to form a cut-off. The term "optical bender" will be understood here as meaning that said step has a cut-off edge 8 and possibly, but not necessarily, a reflective surface, for blocking and/or deflecting a portion of the light beam transmitted in the lightguide. The presence of a reflective surface, for example a convex reflective surface, also has the advantage of allowing the beam to be widened, and therefore of creating a wide cut-off beam. Said cut-off may be achieved by various means comprising, in particular, one or more occluding elements. This occluding element or these occluding elements may comprise an opaque screen, a cover, a mirror, or else a combination of these elements. The height of the cut-off may, in particular, be at the same height as the lower surface 5b of the lightguide. A person skilled in the art will understand, however, that this height can be easily adjusted by a modification of the dimensions and/or of the positions of the surfaces characterizing the lightguide 5.

FIG. 3 illustrates a section in the plane YZ of the collimator 3 and of the coupler 4 as previously described. Said coupler is preferably aligned opposite the collimator 3 in the direction X in such a way that the whole of the light beam transmitted by said collimator is received by said coupler. The coupler 4 is configured to deflect the beam exiting the collimator 3 and to deflect said beam to the interior of the lightguide 5. The coupler 4 has three faces 4a, 4b and 4c, which are configured to reflect and separate said beam into three separate sub-beams. Said faces are typically surfaces working on the basis of total reflection. These sections are each preferably inclined at an angle of 45° with respect to the inclination defined by the horizontal, for example a horizontal plane YZ. This results in adequate redirection of a light beam entering parallel to the direction X in three sub-light-beams directed in the direction Y. The rays exiting the collimator 3 and penetrating into the coupler 4 strike at least one of the sections constituted by one of the faces 4a, 4b or 4c. Each of said faces may have a parabolic or semi-parabolic section in planes parallel to the axes Y and Z. Said parabolic or semi-parabolic sections have a focal region enabling characterization of a main optical axis of a beam transmitted by the module 1, said optical axis being directed in the direction Y. These focal regions may in particular comprise a focus located at the same distance and a summit located at the same height.

As illustrated in FIG. 3, a beam entering the coupler 4 is split into three separate sub-light-beams Fa, Fb and Fc each emitted at 90° with respect to each other, in a plane parallel to the directions Y and Z. The rays of the sub-beam Fa are thus reflected by the face 4a and have a direction substantially parallel to the direction Y. The rays of the sub-beam Fb are reflected by the face 4b and have a direction substantially antiparallel to the direction Z. The rays of the sub-beam Fc are reflected by the face 4c and have a direction substantially parallel to the direction Z.

According to an exemplary embodiment of the invention, a plurality of faces 5c, 5d and 5e, in particular a plurality of planar faces, are disposed in proximity to the coupler 4 in order to redirect all of the rays of the sub-beams Fa, Fb and Fc in the lightguide 5 in a direction substantially parallel to the direction Y. The rays of the sub-beam Fb are thus reflected by the face 4b in a sub-beam Rb directed in the direction Y. The rays of the sub-beam Fc are reflected by the face 4c in a sub-beam Rc directed in the direction Y. The sub-beams Fa, Rb and Rc are thus all directed in a parallel manner toward the bender 8 in the direction Y. The faces 5c, 5d and 5e preferably constitute lateral surfaces of the lightguide 5. The edge face 5c, in particular, is located behind the coupler 4 and joins the upper face 5a and the lower face 5b of the lightguide 5. The faces 5d and 5e are reflective faces working on the basis of total reflection and are disposed at an angle of 45° with respect to the direction Y. In particular, the face 5d is configured in such a way as to reflect any incident ray Fc parallel to the direction Z in a ray Rc parallel to the direction Y. The face 5e is configured in such a way as to reflect any incident ray Fb antiparallel to the direction Z in a ray Rb parallel to the direction Y. Each of the rays constituting the initial light beam emitted by the source 2 is thus redirected in the direction Y onto the bender 8 in the interior of the lightguide 5.

In FIG. 4 depicting a lateral view of the module 1, the plot of the rays transmitted by the coupler 4 in the direction of the bender 8 forming the beam cut-off, and then of the output face 7, has been illustrated in the lightguide 5. The presence of the two steps 6b and 6d makes it possible to modify the height of the lightguide 5 without modifying the thickness thereof. According to an exemplary embodiment of the invention, the ridges of the two steps 6b and 6d are inclined at the same angle with respect to the direction of the horizontal. The upper edge 5a and the lower edge 5b of the guide 5 may have an inclination at the same angle with respect to the direction of the horizontal. The edge 8 thus forms a bender able to form a cut-off of the incident beam transmitted by the means previously described. Said cut-off is produced following a cut-off plane parallel to the lower edge 5b of the guide 5. This cut-off plane is located at the same height as the bender, i.e., the cut-off edge 8. The step at the top, corresponding to the face 5a of said guide, makes it possible to modify the height of the guide 5 while still keeping the thickness of the part constant. All of the light rays exiting the lightguide 5 through the output face 7 are thus forced to propagate only in a region of the space located below said cut-off plane. As a variant, the step of a lightguide may be produced to obtain the cut-off of a lower portion of the beam.

It will be understood that the position and angle of the dihedron 6a-6b are calculated in such a way that the bender formed by the edge 8 blocks the light rays capable of exiting the guide 5 above the cut-off, depicted here in a non-limiting manner as being located at the same height as the optical axis O and the lower edge 5b of the lightguide 5. The parabolic and/or semi-parabolic sections of the coupler 4 are worked in such a way as to define a focal region allowing all of the light beams to be directed onto the edge of the bender 8, in a direction substantially parallel to the optical axis O. The optical axis O is, for example, a horizontal axis directed along Y, and parallel to the upper 5a and lower 5b faces of the guide 5. According to an exemplary embodiment of the invention, the optical axis O defines in particular the main direction of the light beam emitted ensuring an FBL function. The cut-off beam is projected in a direction substantially parallel to the optical axis O. The height of the cut-off line obtained is thus substantially equal to the height of the lower edge 5b of the lightguide 5. The output face 7 makes it possible to close the lightguide 5, for example with the aid of a closing outer lens made of a plastic material or glass. The output face 7 also makes it possible to produce an image of the exiting beam. An output face according to the invention may be, for example, a spherical or cylindrical lens allowing imaging of the edge of the bender 8 and projection of the light beam toward the front of the module 1, in the direction of the road scene.

To summarize, FIG. 4 depicts an exemplary embodiment according to the invention relating to a lighting module 1 comprising an optical element, said optical element comprising a collimator 3 located below a lightguide 5 and a step 6b-6d forming the cut-off means of the optical element. As depicted, the light source 2 is disposed below the collimator 3 and emits toward the top in the direction of the optical coupler 4, configured to deflect all of the rays of the collimated beam along the optical emission axis, in the lightguide 5. According to this exemplary embodiment, the step extends from an upper portion of the lightguide toward a lower portion of said guide, thus forming a downward change in level to produce a cut-off of the upper portion of the beam.

FIGS. 5a, 5b and 5c depict other exemplary embodiments according to the invention. FIG. 5a is thus a variant of a lighting module 1 in which the light source 2 is disposed below the collimator 3 and emits toward the top in the direction of the optical coupler 4. The beam is transmitted in the lightguide 5, and the cut-off beam is projected by the output face 7. According to this variant, the step 6b-6d extends from a lower portion of the lightguide 5 toward an upper portion of said guide, forming an upward change in level in the device to produce a cut-off of the lower portion of the beam.

FIG. 5b is another variant of a lighting module 1 in which the light source 2 is disposed above the collimator 3, said collimator itself being located above the coupler 4. According to this variant, the step 6b-6d extends from an upper portion of the lightguide 5 toward a lower portion of said guide, thus forming a downward change in level. This arrangement and the formation of a downward change in level makes it possible to produce a cut-off of the upper portion of the beam projected by the output face 7.

FIG. 5c is another variant of a lighting module 1 in which the light source 2 is disposed above the collimator 3, said collimator itself being located above the coupler 4. According to this variant, the step 6b-6d extends from a lower portion of the lightguide 5 toward an upper portion of said guide, thus forming an upward change in level. This arrangement and the formation of an upward change in level makes it possible to produce a cut-off of the lower portion of the beam projected by the output face 7.

According to an exemplary embodiment of the invention, the module 1 may have an inclination of a certain angle with respect to the horizontal and around the direction Y, while still having an optical axis O parallel to the direction Y. FIG. 6 illustrates a front view in cross section of said module 1. The direction of emission of the light source 2 is defined by a plane OS, referred to as the emission plane of the sources, passing through the optical axis O of the module. Because of the inclination of the module 1, the plane OS is inclined by a given angle $\alpha$ with respect to the vertical, in particular with respect to a transverse plane OX oriented in the direction X and passing through the optical axis O of the module. Said transverse plane OX is perpendicular to the horizontal, in particular with respect to a horizontal plane OZ. The plane OS is perpendicular to the direction of the bender 8.

As described above, the cut-off of the beam is obtained from the bender 8. When the module 1 is inclined by a certain angle with respect to the horizontal, in particular with respect to the horizontal plane OZ, the cut-off of the beam projected by said module is inclined by an angle $\alpha$, referred to as the angle of inclination of the cut-off.

In order to compensate for this inclination and rectify the cut-off of the beam, the output face 7 comprises rectification means arranged to modify the angle of inclination of the cut-off. According to an exemplary embodiment of the invention, said rectification means comprise a thickness modulation of the output face. In particular, the output face 7 may be worked in such a way as to have a thickness modulation of said output face. Advantageously, the thickness modulation has an angle of inclination $\alpha'$ with respect to the horizontal in the plane of the output face 7. In particular, this thickness modulation is calculated in such a way as to modify the angle of inclination $\alpha$ of the cut-off. According to an exemplary embodiment of the invention, the thickness modulation of the output face may be formed by a boss in the plane of said output face, in particular a sinusoidal or quasi-sinusoidal boss. According to an exemplary embodiment of the invention, said thickness modulation may comprise a plurality of undulations 9, in particular trigonometric undulations. Said undulations are formed in such a way as to be substantially parallel to a plane OS', referred to as the section creation plane or undulation plane. According to an exemplary embodiment of the invention, this section creation plane OS' is inclined by an angle $\alpha'$ with respect to the transverse plane OX. According to an exemplary embodiment of the invention, the angle of inclination $\alpha$ of the cut-off and the angle of inclination $\alpha'$ of the undulations of the undulations are two angles the sum of the values of which equals 90°, plus or minus 5°. In other words, the angle α' between the plane OS' and the plane OX is advantageously complementary to the angle of inclination α between the plane OS and the plane OX.

According to an exemplary embodiment of the invention, said output face may be a lens. According to this exemplary embodiment, said lens may have an undulating face comprising undulations having the same vertical slope, or different vertical slopes with respect to the horizontal. Advantageously, the output face 7 is worked in such a way as to comprise undulations which are substantially parallel to each other in the plane of said output face. Preferably, the undulations 9 are separated from each other at a constant pitch. As a variant, the undulations 9 are separated from each other at a changing pitch. These undulations typically take the form of bosses distributed over the whole of the output face. These bosses may be provided with patterns, and/or may be formed by recesses, reliefs, or else a combination of recesses and reliefs. The presence of undulations on the output face 7 has the effect of modifying the inclination of the cut-off. In particular, these undulations may be calculated in order to produce a beam the cut-off of which is horizontally rectified. The cut-off of the resulting beam may therefore be horizontal, whereas the inclination of the bender 8 generating said cut-off is inclined by a certain angle with respect to the horizontal.

The shape of the modulations on the output face of the module may be a sinusoidal or quasi-sinusoidal boss. The shape of the modulations on the output face of the module is typically a cylindrical or quasi-cylindrical curve.

According to an exemplary embodiment of the invention, the output face 7 is continuous and has undulations 9. Each undulation may be extruded. The geometry of the output face and the geometry of these extruded undulations may correspond to different shapes, for example a cylindrical lens section or else a spherical lens section.

FIGS. 7 and 8 illustrate an example of photometry of a cut-off beam for a lighting module such as described above, whereof the edge of the bender 8 forming said cut-off is inclined by an angle of 30° with respect to the horizontal. The light beam generated by said module may be represented by a set of closed surfaces, corresponding to different isolux curves, for example X1, X2 and X3. Each of these curves corresponds to an isolux curve for a given light flux characterizing the illumination of the beam generated by the module 1.

FIG. 7 illustrates the particular case of a lighting module the output face of which does not comprise a thickness modulation for modifying the cut-off inclination of said beam. As depicted in FIG. 7, the curves X1, X2 and X3 are located below the same cut-off line, represented here by the dotted line C1. It will be understood that said cut-off line C1 is inclined by the same angle as the edge of the bender 8 with respect to the horizontal, in this case an angle of 30°. Said cut-off line C1 is also tangential to the set of curves X1, X2 and X3.

FIG. 8 illustrates the case of a lighting module according to an exemplary embodiment of the invention, the output face of which comprises a thickness modulation making it possible to modify the angle of inclination of the cut-off of said beam with respect to the horizontal. Said thickness modulation of the output face 7 is calculated to modify the angle of inclination of the cut-off line C1 with respect to the horizontal. In the case described here, this angle of inclination is equal to the angle of 30° which is present between the edge of the bender 8 and the horizontal.

When the light rays of the beam pass through the output face 7, the thickness modulation therefore modifies the inclination of the cut-off line C1 in such a way as to obtain a horizontal cut-off line C2. As depicted in FIG. 8, the isolux curves X1, X2 and X3 are thus modified into isolux curves Y1, Y2 and Y3. Said curves are finally all located below the same horizontal cut-off line, depicted here by the dotted line C2.

According to this example, the output face is worked in such a way that the undulations on said output face have a slope of 60° to the horizontal, plus or minus 5°. The angle of the slope is complementary to the angle of 30° formed between the edge of the bender 8 and the horizontal. This mode of embodiment thus makes it possible to rectify a cut-off line of a beam, said generated cut-off line also being inclined by an angle of 30° because of the arrangement of the edge of the bender. Advantageously, a beam is therefore "rectified" by making the image projected from the edge of the bender 8 turn about an axis parallel to the horizontal. This axis passes through the center of the edge of the bender 8 and is parallel to the longitudinal axis of the vehicle.

FIGS. 9a and 9b illustrate a headlamp P1 according to a first exemplary implementation of the invention, in perspective and as a view from above, respectively. Such a headlamp is typically configured in order to provide a part of small thickness. According to the mode of embodiment depicted, said headlamp P1 is formed by several juxtaposed lighting modules which are side by side, preferably five lighting modules 10, 11, 12, 13 and 14 joined to each other. Said modules are configured to prevent the passage of parasitic rays from one module to another. The headlamp P1 may also be provided with attachment points 16 and 17, located on either side of the ends of said headlamp, in order to fix same to the interior of an automobile.

Said five modules are SBL (Static Bending Light) modules, for example. The flux exiting such a device is typically of the order of 340 lm, with an efficiency of 30%. Each of these modules has, individually, all the technical features of a lighting module 5 as described above. The headlamp P1 also comprises a plurality of light sources which are not depicted in FIGS. 9a and 9b. Said light sources, preferably five light sources, are disposed on the same plane below each lighting module. Said light sources are in particular light-emitting diodes (LEDs). In particular, each of the lighting modules 10, 11, 12, 13 and 14 comprises light redirection means comprising a collimator, a coupler, a lightguide and one or more reflection faces combined into a single part and allowing redirection of a light beam in a direction substantially parallel to an optical axis O.

As described above, the collimator of each of said modules has the function of collecting the light beam emitted by all of the light sources located below the lighting modules of the headlamp P1. As described above, the coupler of each of said modules has the function of separating said beam into three sub-beams, and of directing said sub-beams in the lightguide of each module in P1. Each coupler typically has parabolic or semi-parabolic sections. The focuses of these sections are positioned on the edge of a step of the corresponding module, in order to cause the light beams to converge at these focuses and thus produce a cut-off of the beam generated by each module. These sections are therefore configured to direct said sub-beams onto the edges of the benders 10b, 11b, 12b, 13b and 14b, each of said benders being able to produce a cut-off of the beam generated by each module.

The cut-off beam obtained is then directed in the direction of the output surfaces of the modules of the headlamp P1, and in a direction substantially parallel to a given optical axis O. Said optical axis O corresponds, for example, to the optical axis of one of the modules, for example the central module 12. The aperture angle permitted by the output face of each of said modules typically allows a beam having a width of 15° to 20° be generated. The juxtaposition of five of said modules typically allows a resulting global beam having an aperture of between 20° and 80° to be generated.

According to an exemplary embodiment of the invention, the headlamp P1 has an output face formed by a single part, common to all five lighting modules 10, 11, 12, 13 and 14. In particular, and as depicted, the output faces of each of said modules are combined into a single, smooth continuous surface 15, for example an outer lens common to all of the modules. As a variant, said surface may be beaded and/or grainy instead of being smooth. Said surface 15 may have undulations capable of rectifying the cut-off line of the beam generated by each module.

Still according to this exemplary embodiment of the invention, the edges of the benders 10b, 11b, 12b, 13b and 14b of each of the juxtaposed lighting modules are not necessarily aligned on the same line. It will be understood that a small vertical offset may be permitted between two modules joined to one another. Advantageously, the undulations on the output face 15 are configured in such a way that a headlamp consisting of several of said modules generates a resulting beam the cut-off plane of which is parallel to the horizontal. The cut-off therefore appears as a horizontal line on the road. Moreover, each of said modules may be inclined with respect to the horizontal by a certain angle, for example 45°. The edges of the benders 10b, 11b, 12b, 13b and 14b producing the cut-off of the beam generated by each of these inclined modules will therefore also be inclined by an equal angle. Several modules, in particular five modules, are, however, juxtaposed in such a way as to allow the headlamp P1 to generate a light beam having the same cut-off plane.

FIGS. 9a and 9b illustrate a headlamp P1 according to a first exemplary implementation of the invention, in perspective and as a view from above, respectively. Such a headlamp is typically configured in order to provide a part of small thickness. According to the mode of embodiment depicted, said headlamp P1 is formed by several juxtaposed lighting modules which are side by side, preferably five lighting modules 10, 11, 12, 13 and 14 joined to each other. Said modules are configured to prevent the passage of parasitic rays from one module to another. The headlamp P1 may also be provided with attachment points 16 and 17, located on either side of the ends of said headlamp, in order to fix same to the interior of an automobile.

Said five modules are SBL (Static Bending Light) modules, for example. The flux exiting such a device is typically of the order of 340 lm, with an efficiency of 30%. Each of these modules has, individually, all the technical features of a lighting module 5 as described above. The headlamp P1 also comprises a plurality of light sources which are not depicted in FIGS. 9a and 9b. Said light sources, preferably five light sources, are disposed on the same plane below each lighting module. Said light sources are in particular light-emitting diodes (LEDs). In particular, each of the lighting modules 10, 11, 12, 13 and 14 comprises light redirection means comprising a collimator, a coupler, a lightguide and one or more reflection faces combined into a single part and allowing redirection of a light beam in a direction substantially parallel to an optical axis O.

As described above, the collimator of each of said modules has the function of collecting the light beam emitted by all of the light sources located below the lighting modules of the headlamp P1. As described above, the coupler of each of said modules has the function of separating said beam into three sub-beams, and of directing said sub-beams in the lightguide of each module in P1. Each coupler typically has parabolic or semi-parabolic sections. The focuses of these sections are positioned on the edge of a step of the corresponding module, in order to cause the light beams to converge at these focuses and thus produce a cut-off of the beam generated by each module. These sections are therefore configured to direct said sub-beams onto the edges of the benders 10b, 11b, 12b, 13b and 14b, each of said benders being able to produce a cut-off of the beam generated by each module.

The cut-off beam obtained is then directed in the direction of the output surfaces of the modules of the headlamp P1, and in a direction substantially parallel to a given optical axis O. Said optical axis O corresponds, for example, to the optical axis of one of the modules, for example the central module 12. The aperture angle permitted by the output face of each of said modules typically allows a beam having a width of 15° to 20° be generated. The juxtaposition of five of said modules typically allows a resulting global beam having an aperture of between 20° and 80° to be generated.

According to an exemplary embodiment of the invention, the headlamp P1 has an output face formed by a single part, common to all five lighting modules 10, 11, 12, 13 and 14. In particular, and as depicted, the output faces of each of said modules are combined into a single, smooth continuous surface 15, for example an outer lens common to all of the modules. As a variant, said surface may be beaded and/or grainy instead of being smooth. Said surface 15 may have undulations capable of rectifying the cut-off line of the beam generated by each module.

Still according to this exemplary embodiment of the invention, the edges of the benders 10b, 11b, 12b, 13b and 14b of each of the juxtaposed lighting modules are not necessarily aligned on the same line. It will be understood that a small vertical offset may be permitted between two modules joined to one another. Advantageously, the undulations on the output face 15 are configured in such a way that a headlamp consisting of several of said modules generates a resulting beam the cut-off plane of which is parallel to the horizontal. The cut-off therefore appears as a horizontal line on the road. Moreover, each of said modules may be inclined with respect to the horizontal by a certain angle, for example 45°. The edges of the benders 10b, 11b, 12b, 13b and 14b producing the cut-off of the beam generated by each of these inclined modules will therefore also be inclined by an equal angle. Several modules, in particular five modules, are, however, juxtaposed in such a way as to allow the headlamp P1 to generate a light beam having the same cut-off plane.

FIGS. 9a and 9b illustrate a headlamp according to a second exemplary implementation of the invention, in perspective and as a view from above, respectively. A headlamp P1 is formed by several juxtaposed lighting modules which are side by side, preferably five lighting modules 10, 11, 12, 13 and 14 joined to each other.

Similarly to the previous exemplary embodiment, each of said modules comprises a collimator, a coupler, a lightguide and one or more reflection faces combined into a single part. According to this mode of embodiment, the steps 10b, 11b, 12b, 13b and 14b associated with the different juxtaposed lighting modules are substantially aligned with respect to each other. Preferably, the modules of the headlamp are not stepped and are all located at a substantially identical height.

This configuration makes it possible to realize a headlamp of small thickness providing a cut-off beam.

A plurality of light sources, for example five LEDs, are disposed on a plane below said lighting modules. These LEDs are not depicted in FIGS. 10a and 10b. Each of said collimators is configured to collect the largest possible portion of the light intensity emitted by each of said LEDs. The beam is then transmitted to the couplers 10a, 11a, 12a, 13a and 14a located above each collimator, so as to then be directed onto the edge of the benders 10b, 11b, 12b, 13b and 14b in the corresponding lighting module. The rays are then directed in the direction of one or more output surfaces, in a direction substantially parallel to a given optical axis O. According to the present exemplary embodiment of the invention, the output surface or surfaces are configured to counteract the inclination of the modules and/or of the cut-off lines generated by each of the modules.

As previously, the edge of said ridges corresponds to the focal regions of the parabolic sections characterizing said couplers. The ridges then make it possible to produce a cut-off for each beam transmitted by blocking the rays located above the latter. The headlamp P1 has an output face formed by several parts 10c, 11c, 12c, 13c and 14c. These parts may possibly comprise a single output face common to all five lighting modules 10, 11, 12, 13 and 14. These output faces may be formed by one or more smooth surfaces, in order to image the ridges 10b, 11b, 12b, 13b and 14b. Said output faces may equally be modified in such a way as to focus the light on a ridge working on the basis of total reflection. The output image of the module will thus be a cut-off beam.

These features make it possible to realize a headlamp consisting of a single part. According to an exemplary embodiment of the invention, a headlamp having these features is capable of achieving a cut-off illumination function over a very fine output height, advantageously less than 10 mm. It will be understood from the phrase "output height advantageously less than 10 mm" that the distance separating the distal ray of said cut-off beam and the optical axis O of said beam is advantageously equal to or less than 10 mm.

Independently of the dimensions of the corresponding devices, a headlamp according to the first mode of embodiment described and/or a headlamp corresponding to the second mode of embodiment described may in particular be configured to achieve an FBL and/or cornering function, with a light flux equal to or less than 200 lumens.

This type of optical device has the advantage of being formed by a single part in order to achieve the desired imaging, while still having a constant thickness. The small thickness of the part also makes it possible to manufacture this type of headlamp by injection on a conventional press. This mode of manufacture does not require the use of multilayer molds, also reducing the production cost thereof. Finally, this type of device has a reduced size, facilitating incorporation thereof into a vehicle.

Of course, in order to satisfy specific requirements, a person skilled in the field of the invention will be able to apply modifications in the preceding description.

Although the present invention was described above with reference to specific modes of embodiment, the present invention is not limited to specific modes of embodiment, and modifications found in the field of application of the present invention will be obvious to a person skilled in the art.

The invention claimed is:

1. A lighting module for an automobile headlamp, able to emit a cut-off light beam along a predetermined optical axis, said lighting module comprising:
   a light source for generating a beam,
   a lightguide,
   an optical element for receiving the beam generated by the light source and configured to form from this beam said cut-off light beam,
   said optical element comprising:
      a collimator configured to receive the beam generated by the light source and to collimate this beam into a collimated beam,
      an optical coupler configured to couple the collimated beam into a coupled beam in the lightguide,
      a cut-off means disposed within said lightguide on the path of the rays of the coupled beam and configured to intercept a portion of said rays in the lightguide and to form a cut-off beam, and
      at least one output face of said lightguide configured to project said cut-off beam outside of the optical element, and characterized in that the optical element is formed as a single part.

2. The lighting module according to claim 1, wherein said lightguide has a substantially constant thickness.

3. The lighting module according to claim 2, wherein said cut-off means forms a step in the lightguide, said step forming an angle with a horizontal portion and with an inclined portion.

4. The lighting module according to claim 1, wherein said cut-off means forms a step in the lightguide, said step forming an angle with a horizontal portion and with an inclined portion.

5. The lighting module according to claim 4, wherein said collimator is a solid of revolution having an axis of revolution and comprises one or more reflective surfaces.

6. The lighting module according to claim 1, wherein said collimator is a solid of revolution having an axis of revolution and comprises one or more reflective surfaces.

7. The lighting module according to claim 6, wherein said collimator comprises a lens, a reflector, a refractor, or a collimation means of the convex or convex type.

8. The lighting module according to claim 1, wherein said collimator comprises a lens, a reflector, a refractor, or a collimation means of the convex or convex type.

9. The lighting module according to claim 8, wherein said optical coupler comprises a plurality of reflective faces, each of said reflective faces having a section in the shape of a polynomial segment.

10. The lighting module according to claim 9, wherein each of said reflective faces has a section in a parabolic shape.

11. The lighting module according to claim 9, wherein the cutoff means produces a cut-off plane parallel to a lower surface of the lightguide.

12. The lighting module according to claim 9, wherein the cutoff means produces a cut-off plane parallel to and aligned with a lower surface of the lightguide.

13. The lighting module according to claim 1, wherein said optical coupler comprises a plurality of reflective faces, each of said reflective faces having a section in the shape of a polynomial segment.

14. The lighting module according to claim 13, wherein said optical coupler is configured to split the collimated beam into three separate sub-light-beams, each emitted at 90° with respect to each other.

15. The lighting module according to claim 1, wherein said optical coupler is configured to split the collimated beam into three separate sub-light-beams, each emitted at 90° with respect to each other.

16. The lighting module according to claim 15, wherein said light source comprises a plurality of light-emitting diodes disposed on the same plane, said plane being disposed under said collimator and/or under the cut-off means with respect to said optical axis.

17. The lighting module according to claim 1, wherein said light source comprises a plurality of light-emitting diodes disposed on the same plane, said plane being disposed under said collimator and/or under the cut-off means with respect to said optical axis.

18. The lighting module according to claim 1, wherein said lightguide has an upper face and a lower face joined together by an edge face, said upper face and said lower face extending in planes which are substantially parallel to one another.

19. The lighting module according to claim 1, wherein said lightguide comprises at least one reflective face configured to receive a portion of the rays of the beam coupled by the optical coupler and for reflecting and focusing these rays onto the cut-off means.

20. The lighting module according to claim 1, wherein the distance separating the distal ray of said cut-off beam and said optical axis is equal to or less than 10 mm.

21. The lighting module according to claim 1, wherein the cutoff means includes a surface inclined with respect to a lower surface of the lightguide.

22. A headlamp comprising several lighting modules according to claim 1, wherein several of said modules are juxtaposed in order to generate a beam, said resulting beam following the direction of an optical axis of one of said modules.

23. The headlamp according to claim 22, wherein the output faces of each of said modules are combined into a single smooth, continuous surface, especially an outer lens common to said several modules.

24. The headlamp according to claim 23, wherein said modules are configured to produce at least one of a fixed bending light function and a cornering function with a light flux equal to or greater than 200 lumens.

25. The headlamp according to claim 22, comprising five of said modules.

* * * * *